(No Model.) 3 Sheets—Sheet 1.

W. H. NORTHALL.
VISE.

No. 331,905. Patented Dec. 8, 1885.

Witnesses
J. S. Williamson
W. T. Haviland

Inventor
William H. Northall
By Smith & Hubbard
Attys (No Model.) 3 Sheets—Sheet 2.

W. H. NORTHALL.
VISE.

No. 331,905. Patented Dec. 8, 1885.

Witnesses
S. S. Williamson
W. T. Haviland

Inventor
William H. Northall
By Smith & Hubbard
Atty's.

(No Model.) 3 Sheets—Sheet 3.

W. H. NORTHALL.
VISE.

No. 331,905. Patented Dec. 8, 1885.

Witnesses
S. S. Williamson
W. T. Haviland

Inventor
William H. Northall
By Smith & Hubbard
Atty's.

UNITED STATES PATENT OFFICE.

WILLIAM H. NORTHALL, OF BRIDGEPORT, CONNECTICUT.

VISE.

SPECIFICATION forming part of Letters Patent No. 331,905, dated December 8, 1885.

Application filed September 15, 1884. Serial No. 143,052. (No model.)

*To all whom it may concern:*

Be it known that I, WILLIAM H. NORTHALL, a citizen of the United States, residing at Bridgeport, in the county of Fairfield and State of Connecticut, have invented certain new and useful Improvements in Bench-Vises; and I do hereby declare the following to be a full, clear, and exact description of the invention, such as will enable others skilled in the art to which it appertains to make and use the same.

My invention relates to certain novel and useful improvements in bench-vises, and has for its object to improve on the construction shown and described in my Letters Patent Nos. 292,135 and 298,225, granted, respectively, January 15, 1884, and May 6, 1884, and in my present application filed February 29, 1884, Serial No. 122,434. With these ends in view my invention consists in the details of construction and combination of elements hereinafter fully described, and then specifically designated by the claims.

In order that those skilled in the art to which my invention appertains may more fully understand its construction and operation, I will proceed to describe the same in detail, referring by letter to the accompanying drawings, forming a part of this specification, in which—

Figure 1:
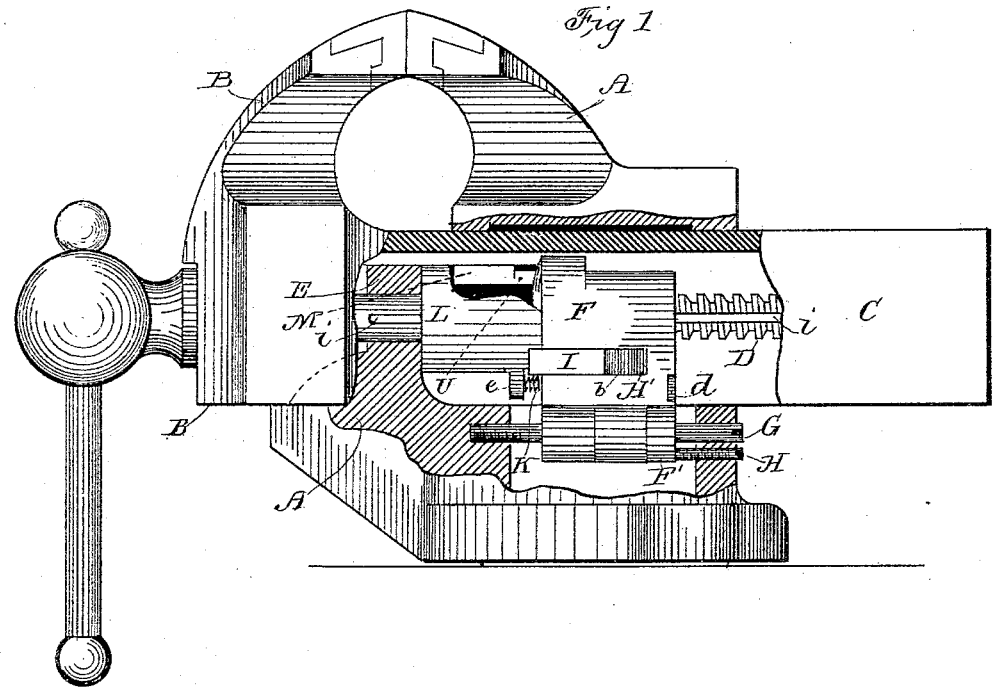
Figure 2:
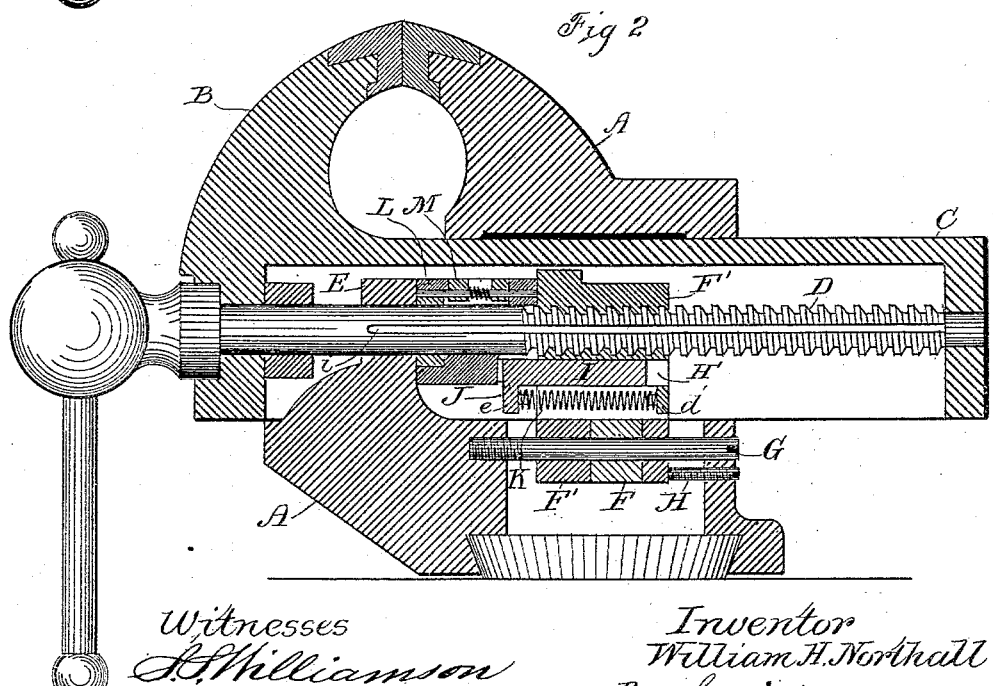
Figure 3:
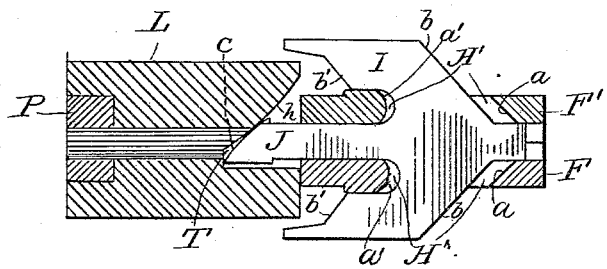
Figure 4:
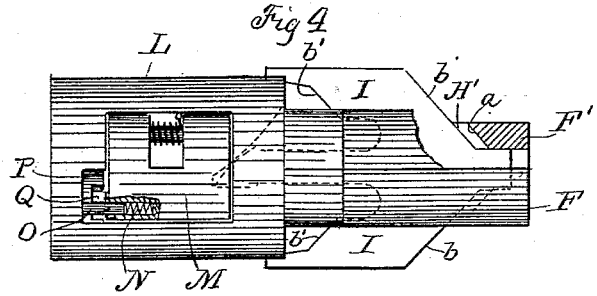
Figure 5:
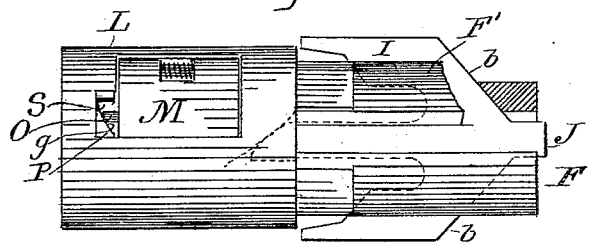
Figure 6:
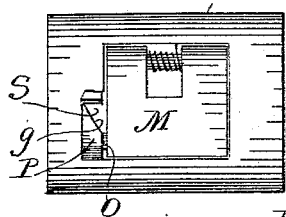
Figure 7:
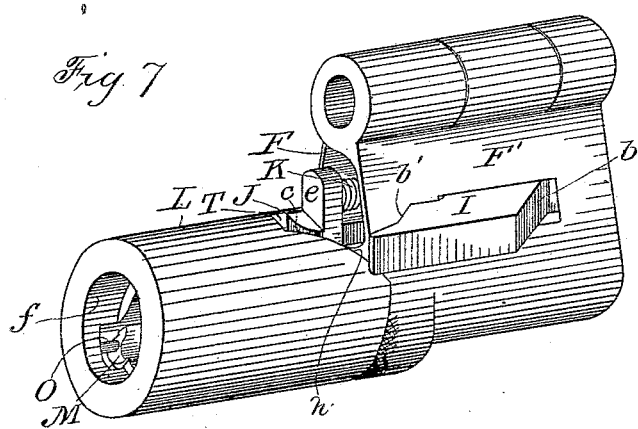
Figure 8:
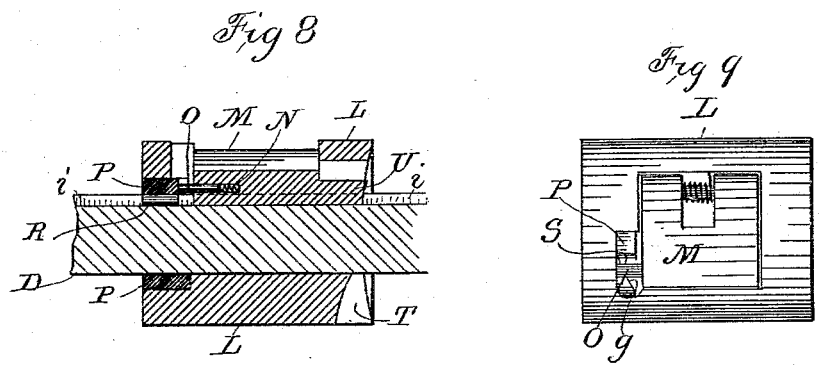
Figure 9:
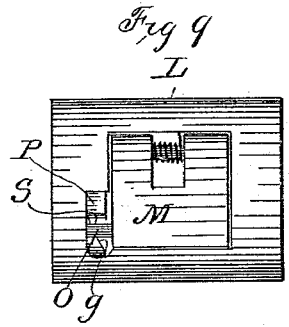

Figure 1 is a side elevation with the stationary jaw and tail-piece partly broken away; Fig. 2, a central vertical longitudinal section; Fig. 3, a detail horizontal section taken just above the wedge; Fig. 4, a detail plan view of the sleeve, wedge, and nut in proper relative position, the sections of the nut being closed; Fig. 5, a view similar to Fig. 4, with the sections of the nut spread apart; Fig. 6, a detail plan view of the sleeve and ring in their proper relative position, and showing the spring-pin just beyond the inclined wall of the niche in the ring; Fig. 7, a bottom view, in perspective, of the nut-sections and sleeve in their proper relative position, and showing the notch in the sleeve, and the inclined heel of the wedge in juxtaposition; Fig. 8, a detail sectional view taken through the sleeve and ring therein and the screw-shank; Fig. 9, a view similar to Fig. 6, but showing the spring-pin resting on the ring near the base of the inclined wall of the niche; and Fig. 10, a detail perspective of the ring.

Similar letters denote like parts in the several figures of the drawings.

In the construction exhibited in my said patents and pending application a possible objection was met with, owing to the fact that the slight turning of the screw to enable the movable jaw to operate as a slide did not spread the jaws sufficiently apart to permit of the withdrawal or shifting of the work. Moreover, it often happens that small work is continually operated upon, and now and then it becomes necessary to spread the jaws to accommodate larger work, and it is very inconvenient to keep changing the nature of the vise.

My present improvement allows of the turning of the screw so as to release the work without changing the nature of the vise, and, furthermore, work of slightly varying thicknesses—say from one to three tenths of an inch—may be clamped and released, as in the ordinary screw-vise.

A is the body of the vise, swiveled in the usual manner. The movable jaw is indicated by B, and is provided with the usual tail-piece C, within which is secured the screw D, in the usual manner and position. The tail-piece is adapted to have an endwise movement in the body of the vise in the usual manner. E is an abutment secured to or cast integral with the body, and through which the screw D passes freely. Within the body are pivoted two nut-sections, F F', upon a screw, G, after the manner of a hinge.

H is a set-screw, by means of which the pressure of the nut-sections and parts directly connected therewith against the abutment E is relieved or established, as the case may be, as will be hereinafter described. The nut-sections are recessed, as seen at H', to accommodate a wedge, I. The forward walls of this recess are beveled, as shown at $a$, and the inclines $b\ b$ of the wedge are adapted to be forced against said bevels and spread the nut-sections. The rear walls of said recess are rounded and beveled, as shown at $a'$, and the inclines $b'\ b'$ of the wedge will, when the latter has spread the nut-sections, be within the recess and in contact with the bevels $a'$. When the spring K throws the wedge backward, the inclines b' b' will be forced against the surfaces a', and thereby close the said sections.

J is the heel of the wedge, and consists in a shank-like projection, which is beveled at its extremity, as shown at c. The section F' and the heel J are formed with lugs d e, respectively, between which extends the coil-spring K in such manner that the wedge will operate with a spring movement. The wedge is forced against the beveled walls of the recess in the nut-sections in opposition to the resiliency of the spring, and the latter acts to throw the wedge back to its normal position and allow the sections to close. A sleeve, L, has an opening on one side, within which is pivoted the spring-actuated pawl M in the same manner as in my pending application above referred to. Within the forward portion of this pawl is a coil-spring, N, against which rests a pin, O, so as to project from the side of said pawl and come in contact with the forward wall of the opening in the sleeve, as shown at Figs. 4 and 5. The rear extremity of the sleeve is recessed, as seen at f, Fig. 7, to accommodate a ring, P. The opening in this ring is of a diameter sufficient to admit the shank of the screw D.

Figure 10:
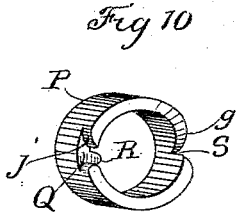

Q is an opening in the inner edge of said ring, and on the same side of the latter and opposite this opening, and extending across the inner face of the ring, is a spline, R, which fits within a slot, i, in the screw D, so that said ring will be continually revolved with said screw, as will be seen by reference to Figs. 9 and 10. One side of this opening is inclined, as seen at j. Opposite to the opening Q is a niche, S, formed in said ring at the inner edge. This niche is wider than said opening, and its lateral wall g is inclined from the angle of the niche to the inner edge of the ring, for the purpose presently explained. In its assembled position the ring extends beyond the wall of the opening in the sleeve, as shown at Figs. 4 and 5, and upon said ring the spring-pin O, held in contact therewith by the downward pressure of the pawl M. The inner end of the sleeve L is notched, as shown at T, one wall of this notch being beveled or inclined, as shown at h, Figs. 3 and 7. By reference to Fig. 7 it will be seen that when assembled together in the proper relative position the heel J will extend within said notch in such manner that the inclines or bevels will be contiguous in parallel planes, so that it will be readily understood that the turning of the sleeve in the direction indicated by the arrow will cause the incline of the notch to throw the wedge forward, thereby forcing the inclines b b against the beveled walls a of the nut-sections, and causing the latter to be spread apart.

U is a side projection from the pawl M, cast with the same or rigidly secured thereto, the sleeve being cut away to permit the movement of the same in unison with said pawl. The extremity of this projection is beveled downward and inward, as shown at Fig. 1, so that when the nut and sleeve are jammed together the pawl will be held in an elevated position and entirely free from the screw, so that the latter may be turned in either direction and operate the movable jaw after the manner of the ordinary screw-vise.

The operation of my improvement is as follows: To throw the nut-sections clear of the screw D, so the jaw B and said screw may be free to slide in the body A, the screw H is backed to allow a slight backward play of the nut-sections and sleeve when the said sections and screw are disengaged. The screw D is then turned to the left, the spring-pin O meantime resting upon the ring P. As the latter is turned either the opening Q or niche S will first come under the pin. If the opening Q comes first, as shown in Fig. 4, then the pin will not drop down in the same, because said opening does not extend to the wall of the sleeve against which the pin abuts, but affords a narrow ledge, over which said pin will ride. When the niche S comes below the pin, as seen in Fig. 5, the latter will drop down, and with it the pawl M, and the pawl will then be supported by the screw D. As the ring continues to revolve, the incline g will act against the pin and force it backward, so that it will abut against the inner edge of the ring when said niche has passed by, as shown at Fig. 6. The opening Q will, as the ring turns, now come opposite to said pin, when the latter will shoot within the same, and thereby allow the pawl to drop into the slot i, as shown at Fig. 8. The movement of the screw toward the left will now carry the sleeve with it, and cause the bevels h to force the wedge forward and spread the nut-sections, as hereinbefore set forth. The operator holds the screw and sleeve in this position, and is thereby enabled to slide the jaw B back and forth. By turning the screw toward the right the pawl will be thrown out of the slot a, and the pin will ride up the incline j of the opening Q until it again rests upon the ring, and thus keep the pawl in an elevated position. The set-screw H is now driven against the nut, and the parts secured as against lateral displacement. Of course, it will be clearly understood that the backing of this screw H allows the nut-sections to move forward at the turning of the screw D to the left, and thereby release the pawl and allow it to rest on the screw or be supported by the pin O, as the case may be. As the opening Q and the niche S are opposite to each other and on different sides of the ring, it will be readily understood that the screw D must revolve at least one-half a whole turn before the sleeve can be turned, and if the relative position of the pin O and niche is as shown at Fig. 9, then the screw will have to be revolved to the left a turn and a half before this result can be accomplished. Thus it will be seen that in changing the vise from a screw action to that of a sliding jaw the screw will revolve in engagement with the nut-sections through a half-turn, and this will not only enable the work to be released, but will also permit work of slightly-varying gages to be accommodated between the jaws and held and released by the action of the screw.

Having thus described my invention, what I claim as new, and desire to secure by Letters Patent, is—

1. In a vise of the character described, the combination, with the body of the vise and the screw for operating the movable jaw, of the nut-sections pivoted within said body, a spring-actuated wedge arranged within said sections and capable of being forced against the latter and spread them apart, a sleeve mounted upon said screw and adapted to operate the wedge, and an abutment against which the sections and sleeve are forced, substantially as set forth.

2. The screw arranged within the body of the vise and having mounted thereon the sleeve, constructed as described, in combination with the nut-sections pivoted in said body, and adapted to be thrown in and out of engagement with said screw, and an abutment, by which the backward movement of the several parts connected with the screw is arrested, substantially as set forth.

3. In combination with the nut-sections provided with recesses having beveled front wall and rounded and beveled rear walls, as shown, the wedge arranged within said recesses and adapted to be forced against said walls, thereby opening and closing the sections, substantially as described.

4. In combination with the wedge having inclines and provided with beveled heel, as described, the nut-sections pivoted together, and adapted to be opened and closed by the action of said wedge, substantially as shown and set forth.

5. The combination, with the wedge and nut-sections, constructed and arranged as described, of the sleeve mounted upon the screw, and having incline notch adapted to be forced against the heel of the wedge, substantially as set forth.

6. The combination, with the sleeve having arranged therein the spring-pawl and spring-pin projecting from the side of said pawl, of a ring seated within the forward end of said sleeve and projecting slightly beyond the walls of the opening, whereby a ledge is formed to support the pin and pawl, said ring connected to the jaw-screw by a spline, and adapted to allow the pawl to drop into the trough or slot of the spline, whereby the screw and sleeve may turn in unison when the former is operated toward the left, substantially as shown and set forth.

7. In combination with the sleeve having pivoted therein the spring-pawl provided with a laterally-projecting and spring-actuated pin, nut-sections pivoted together and wedge arranged within said sections, and adapted to open and close the same, the ring having in its inner edge an opening and niche, formed as described, and having also a spline extending within an elongated slot in the screw, which operates the movable jaw, whereby a lock connection between the screw and sleeve may be effected, substantially as set forth.

8. In combination with the sleeve mounted upon the shank of the jaw-screw, and having spring-pawl therein and spring-pin projecting laterally from said pawl, the ring provided with a spline extending within an elongated slot in the screw, and having in its inner edge an opening and a niche, and seated within said sleeve, and projecting slightly beyond the wall of the opening thereof, whereby a support for the said pin and pawl is afforded, and the latter permitted to engage with the slot in the screw within which the ring is splined, substantially as and for the purpose set forth.

9. The combination, with the nut-sections F F', pivoted within the stationary jaw or body A, and having recesses H', with bevels $a$ and $a'$, of the wedge I, having inclines $b$ $b'$, and beveled heel J, spring K, confined between projections formed on the wedge and one of the nut-sections, sleeve L, having notch T, with incline $c$, capable of being forced against the said heel by the turning of said sleeve toward the left, spring-pawl M, having projection U, against which the contiguous edges of the nut-sections may be forced, whereby the pawl is kept in an elevated position, if desired, spring-pin O, ring P, seated in the forward end of the sleeve, and having in the inner edge thereof opening Q, provided with bevel $j$, and niche S, provided with bevel $g$, the width of said opening being less than that of the niche, spline R on the inner surface of said ring, screw D, passing through the sleeve and nut-sections and mounted within the movable jaw B, and having elongated slot $i$, within which the said spline fits, abutment E, and screw H, passing through the body against the nut-sections, all arranged and operating substantially as and for the purpose hereinbefore shown and specified.

In testimony whereof I affix my signature in presence of two witnesses.

WILLIAM H. NORTHALL.

Witnesses:
S. S. WILLIAMSON,
H. T. SHELTON, Jr.